UNITED STATES PATENT OFFICE.

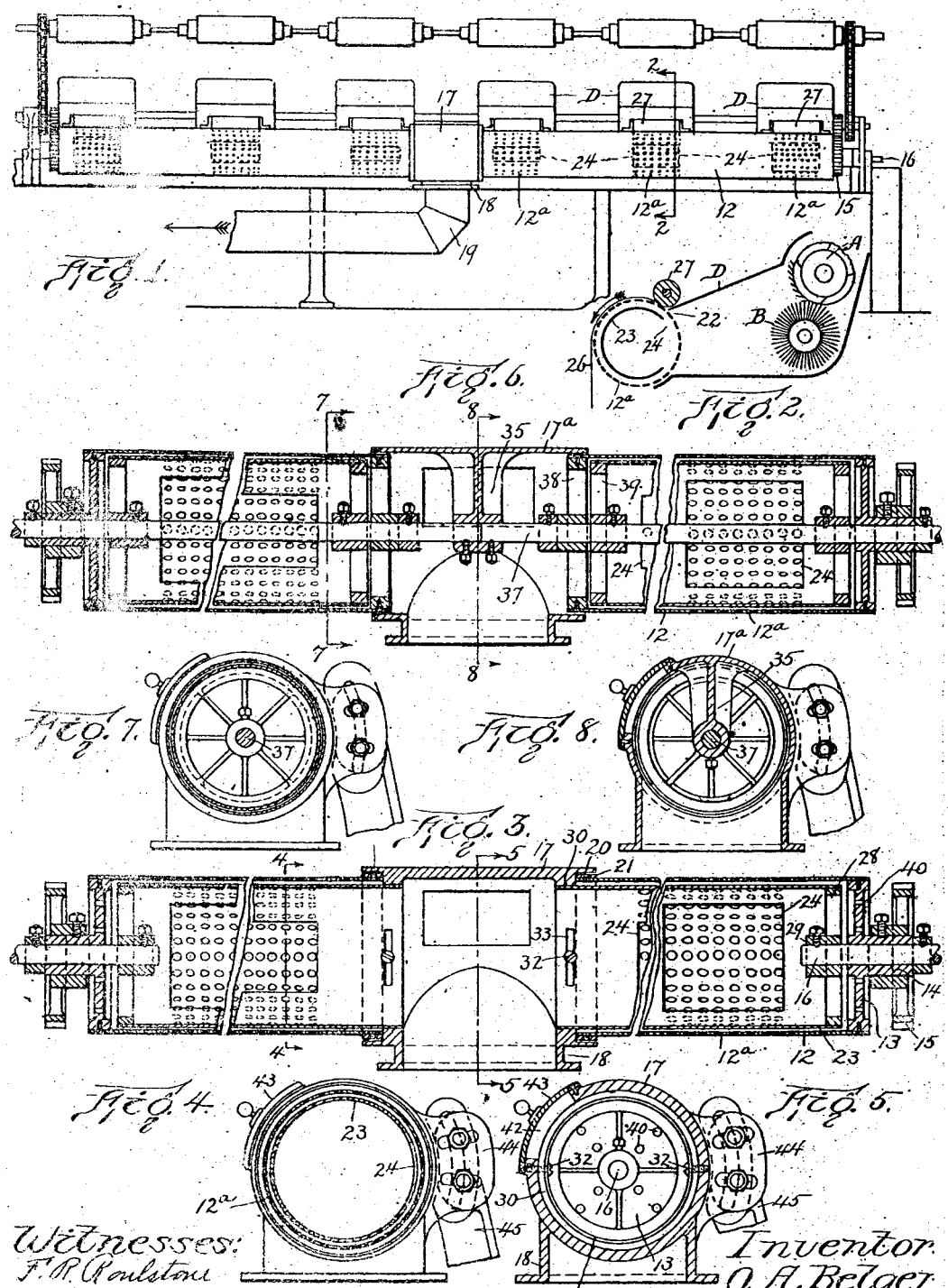

OTTO A. BELGER, OF BOSTON, MASSACHUSETTS.

WASTE-COLLECTOR FOR COMBING-MACHINES.

1,106,073.  Specification of Letters Patent.  Patented Aug. 4, 1914.

Application filed November 18, 1913. Serial No. 801,611.

*To all whom it may concern:*

Be it known that I, OTTO A. BELGER, a subject of the Emperor of Germany, and a resident of Boston, in the county of Suffolk and State of Massachusetts, have invented certain new and useful Improvements in Waste-Collectors for Combing-Machines, of which the following is a specification.

This invention relates to combing machines of the character set forth by the Roth United States patent, No. 905,233, dated December 1, 1908. In said machine are combined a combing member, a stripping member coöperating therewith to remove the waste therefrom, a casing inclosing those parts of the combing and stripping members which are in contact with each other, means for creating a forced draft through the casing in a direction to take off the waste from these members, a rotating perforated screen situated within the casing at a point between the stripping member and the exit of the casing and moving in such manner as to carry the waste arrested to a point out of the range of the forced draft, and a stationary shield on that side of the screen to which the draft passes and covering a portion of the screen so that the draft cannot pass through the screen at this point and consequently the waste is released therefrom.

The object of this invention is to provide certain improvements in the waste collecting and removing portions of a combing machine of this character, whereby a plurality of combing and stripping members are enabled to coöperate with a single elongated perforated screen, the latter forming a portion of an air conduit extending from the combing and stripping members to air exhausting means, and the said conduit including a fixed member which supports the inner ends of the rotary screen and of the shield, and is adapted to be connected with air exhausting means such as an exhaust fan, said fixed member and shield forming an unobstructed air passage which enables air to be exhausted simultaneously from a number of combing and stripping members by a single exhaust fan or other like apparatus.

Of the accompanying drawings:—Figure 1 represents a side elevation showing somewhat diagrammatically the back side of a combing machine having a waste collector embodying my invention. Fig. 2 represents a diagrammatic section on line 2—2 of Fig. 1. Fig. 3 represents a longitudinal section of the waste collector shown by Fig. 1, parts of the rotary screen and fixed shield being broken away. Fig. 4 represents a section on line 4—4 of Fig. 3. Fig. 5 represents a section on line 5—5 of Fig. 3. Fig. 6 represents a view similar to Fig. 3 showing a waste collector as constructed prior to my invention. Fig. 7 represents a section on line 7—7 of Fig. 6. Fig. 8 represents a section on line 8—8 of Fig. 6.

Referring to Figs. 1, 2, 3, 4 and 5,—12 represents an elongated tube preferably of sheet metal and having at its outer end a practically closed head 13 provided with a central journal 14 to which is attached a gear 15.

16 represents a fixed stud or bearing which rotatatively supports the journal 14 of the tube 12.

17 represents a fixed air conduit member which is preferably approximately T-shaped, the body portion of said member being cylindrical and provided with a lateral flanged branch 18 adapted to be coupled to a pipe 19 leading to the casing of an exhaust fan blower, not shown. The member 17 is provided with an internal annular bearing 20 which receives the rotatively supports the inner end of the tube 12, said inner end being preferably reinforced by a peripheral ring 21 constituting a journal in movable contact with the bearing 20.

The tube 12 is provided with a plurality of perforated zones 12ª which are separated as shown by Fig. 1 by imperforate portions of the tube, said zones being spaced apart and coinciding with casings D which correspond in number with the perforated zones, each casing inclosing a combing member A and a stripping member B. Said members and the casing D may be constructed and adapted to coöperate in the manner described in the Roth patent above referred to. Each casing has an outlet 22 which is formed as indicated by Fig. 2 to receive a portion of the periphery of the tube 12 so that air drawn inwardly into the tube through its perforated periphery will create a forced draft in the casing and carry waste from the members A, B, to the perforated zones of the tube 12.

23 represents an elongated tubular shield located within the tube 12 and concentric therewith, said shield being provided with openings 24 which permit air impinging on the outer periphery of a perforated zone 12ᵃ to enter the shield at one side thereof, so that waste carried by the air is caused to adhere to the portion of the perforated zone coinciding with the opening 24.

The rotation of the tube 12 continuously removes the collected waste from a point opposite the opening 24, the removed waste being no longer held by atmospheric pressure against the perforated tube and being condensed into a fleece or sliver 26, Fig. 2, by means such as a pressure roll 27 arranged as shown by Fig. 2.

The operation of the machine so far as the collection of the waste into a fleece or sliver is concerned, is the same as that described in the above-mentioned patent to which reference is made for a fuller description.

The outer end of the shield 23 is provided with a spider, the hub 29 of which is rigidly attached to the center bearing 16. The inner end of the shield 23 is open and unobstructed and projects from the inner end of the tube 12 into the fixed conduit member 17. Said member is provided within the bearing 20 with an annular internal seat 30 in which the inner end of the shield 23 closely fits and to which said end is fixedly secured by any suitable means preferably screws 32 passing through slots 33 in the shield. The slots 33 and screws 32 permit the shield to be adjusted to bring its openings 24 into suitable relation with the outlets of the casings D.

It will now be seen that air exhausted from the conduit member 17 through the pipe 19 will cause a forced draft of air from the combing and stripping members through the casings D, the tube 12 and the shield 23. It will also be seen that the described construction enables the inner end of the shield 23 to be left entirely unobstructed and provides an unobstructed air passage through the fixed member 17 so that a single air exhausting fan or other apparatus is adapted to draw waste from a relatively large number of combing and stripping members, the air current set up being fully utilized owing to the absence of obstructions in the inner end of the shield and in the interior of the fixed member 17.

Prior to my invention, a waste collector of the construction shown by Figs. 6, 7 and 8 has been employed. In this prior construction, the fixed conduit member 17ᵃ is provided with an inwardly projecting bracket 35 which supports the inner end of a stud 37. The elongated perforated tube 12 projects into the fixed member 17ᵃ and is provided at its inner end with a spider 38, the hub of which forms a journal rotating on the stud 37. The inner end of the shield is provided with a spider 39, the hub of which is fixedly secured on the stud 37.

It will be seen by comparing Figs. 3 and 6 that my improved construction eliminates all obstructions of the inner end of the shield and of the interior of the fixed conduit member. To prevent the formation of a dead air space at the outer end of the tube 12, I provide the head 13 with small air passages 40, Figs. 3 and 5, adapted to permit the entrance of a limited quantity of external air. The air thus admitted prevents a body of stagnant air from remaining in the outer end portions of the tube 12 and shield 23, and therefore prevents the waste from settling, accumulating in said outer end portions and eventually clogging the adjacent shield opening 24.

The described construction is preferably duplicated at each end of the fixed member 17, both ends of said member being open, and said ends being formed to support the inner ends of two tubes 12 and two shields 23. It is obvious, however, that one end of the fixed conduit member 17 may be permanently closed if the construction of the carding machine renders this desirable.

The fixed conduit member 17 may be provided with a handhole 42 and with a cover 43 therefor. Figs. 4 and 5 show the fixed member 17 provided with a slotted ear 44 attached by bolts to supports 45.

The perforated zones of the tube 12 constitute multiple screens which are connected in a series by the imperforate portions of the tube.

I claim:—

1. In a combing machine of the character described, a waste collector comprising an elongated rotary tube having perforated peripheral zones and an open inner end, a fixed shield within said tube having an open unobstructed inner end projecting through and beyond the inner end of the tube, a bearing rotatively supporting the outer end of the tube and fixedly supporting the outer end of the shield, and a fixed air conduit member formed to fixedly support the inner end of the shield and to rotatively support the inner end of the tube, and provided with an air outlet adapted to be connected with air-exhausting means, the interior of said chamber forming an unobstructed air passage.

2. In a combing machine of the character described, a waste collector comprising an elongated rotary tube having perforated peripheral zones, an open inner end and a head at its outer end provided with a central journal, a fixed shield within said tube having an open unobstructed inner end and a spider at its outer end, the inner end of the shield projecting through and beyond the inner end of the tube, a fixed bearing rotatively supporting the said central journal and fixedly supporting said spider, and a fixed air conduit member formed to fixedly support the inner end of the shield and to rotatively support the inner end of the tube, and provided with an outlet adapted to be connected with air-exhausting means, the said shield and the interior of said chamber forming an unobstructed air passage.

3. In a combing machine of the character described, a waste collector comprising an elongated rotary tube having perforated peripheral zones, an open inner end and a head at its outer end provided with a central journal, a fixed shield within said tube having an open unobstructed inner end and a spider at its outer end, the inner end of the shield projecting through and beyond the inner end of the tube, a fixed bearing rotatively supporting the said central journal and fixedly supporting said spider, and a fixed air conduit member rotatively supporting the inner end of the tube and having an internal annular seat to which the inner end of the shield is attached, said fixed conduit member having an air outlet adapted to be connected with air-exhausting means.

4. In a combing machine of the character described, a waste collector comprising an elongated rotary tube having perforated peripheral zones, an open inner end and a head at its outer end provided with a central journal, a fixed shield within said tube having an open unobstructed inner end and a spider at its outer end, the inner end of the shield projecting through and beyond the inner end of the tube, a fixed bearing rotatively supporting the said central journal and fixedly supporting said spider, and a fixed air conduit member formed to fixedly support the inner end of the shield and to rotatively support the inner end of the tube, and provided with an outlet adapted to be connected with air-exhausting means, the head of the tube being provided with one or more air passages adapted to permit a limited entrance of air into the outer ends of the tube and shield.

In testimony whereof I have affixed my signature, in presence of two witnesses.

OTTO A. BELGER.

Witnesses:
C. F. BROWN,
P. W. PEZZETTI.